United States Patent
Tanaka

(10) Patent No.: US 10,063,742 B2
(45) Date of Patent: Aug. 28, 2018

(54) INTEGRATED CIRCUIT, IMAGE PROCESSING APPARATUS, AND IMAGE FORMING APPARATUS THAT SELECTS DENSITY CONVERSION INFORMATION ACCORDING TO A SELECTED IMAGE PROCESSING METHOD

(71) Applicant: Shinya Tanaka, Tokyo (JP)

(72) Inventor: Shinya Tanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/564,493

(22) Filed: Dec. 9, 2014

(65) Prior Publication Data

US 2015/0213340 A1    Jul. 30, 2015

(30) Foreign Application Priority Data

Jan. 27, 2014 (JP) ................................. 2014-012818

(51) Int. Cl.
| | | |
|---|---|---|
| *G03G 15/043* | (2006.01) | |
| *G06K 15/02* | (2006.01) | |
| *H04N 1/409* | (2006.01) | |

(52) U.S. Cl.
CPC ................................ *H04N 1/4092* (2013.01)

(58) Field of Classification Search
CPC ............... H04N 1/40; H04N 1/400062; H04N 1/40062; H04N 1/4092; G06K 15/1822; G06K 15/1877; G06K 15/02; G03G 15/00; G03G 15/5025; G03G 15/5041; G03G 15/556; G03G 2215/00029; G03G 15/0043

USPC ............... 358/462; 382/233, 104, 199, 209; 399/51
See application file for complete search history.

(56) References Cited

U.S. PATENT DOCUMENTS

| | | | | |
|---|---|---|---|---|
| 5,787,195 A * | 7/1998 | Tsujimoto | .......... | H04N 1/40062 358/462 |
| 6,052,489 A * | 4/2000 | Sakaue | .......................... | 382/266 |
| 6,529,630 B1 * | 3/2003 | Kinjo | ............................ | 382/203 |
| 7,460,274 B2 * | 12/2008 | Hirano | ........................... | 358/1.9 |
| 8,374,432 B2 * | 2/2013 | Yamakawa | ................... | 382/176 |
| 2003/0218774 A1 * | 11/2003 | Masaki | ............. | G06K 15/1822 358/1.16 |
| 2009/0214238 A1 * | 8/2009 | Tanaka | ............... | H04N 1/40037 399/51 |

(Continued)

FOREIGN PATENT DOCUMENTS

| | | |
|---|---|---|
| JP | 2773081 | 7/1998 |
| JP | 2002-086805 | 3/2002 |
| JP | 2009-172970 | 8/2009 |

*Primary Examiner* — Benny Q Tieu
*Assistant Examiner* — Juan M Guillermety
(74) *Attorney, Agent, or Firm* — Oblon, McClelland, Maier & Neustadt, L.L.P.

(57) ABSTRACT

An integrated circuit includes a pixel identifying unit that extracts a target partial image formed of a pixel of interest and adjacent pixels from input image data, determines a character of the pixel of interest based on the pixel of interest and the adjacent pixels, and generates identification information indicating a result of determination on the character; and a density converting unit that converts a density of a pixel of the image data based on a contour extraction function or an edge density reducing function on the image data by using the identification information.

20 Claims, 10 Drawing Sheets

(56) References Cited

U.S. PATENT DOCUMENTS

| | | | | |
|---|---|---|---|---|
| 2012/0224775 A1* | 9/2012 | Genda | ............... | H04N 19/176 382/233 |
| 2013/0216132 A1* | 8/2013 | Ono | ..................... | H04N 1/52 382/165 |
| 2013/0258412 A1* | 10/2013 | Otsuka | ............. | G03G 15/5025 358/3.01 |
| 2013/0343646 A1* | 12/2013 | Hata | ................. | G06K 9/4652 382/165 |

* cited by examiner

● : BLACK PIXEL

● : BLACK PIXEL
△ : ANY OF THEM IS WHITE PIXEL

○ : WHITE PIXEL
× : EITHER PIXEL IS OK

INTEGRATED CIRCUIT, IMAGE PROCESSING APPARATUS, AND IMAGE FORMING APPARATUS THAT SELECTS DENSITY CONVERSION INFORMATION ACCORDING TO A SELECTED IMAGE PROCESSING METHOD

CROSS-REFERENCE TO RELATED APPLICATIONS

The present application claims priority to and incorporates by reference the entire contents of Japanese Patent Application No. 2014-012818 filed in Japan on Jan. 27, 2014.

BACKGROUND OF THE INVENTION

1. Field of the Invention

The present invention relates to an integrated circuit, an image processing apparatus, and an image forming apparatus.

2. Description of the Related Art

Electrophotography image forming apparatuses, such as laser printers, digital copiers, and facsimile machines, form electrostatic latent images by scanning charged photoconductors with laser beams emitted from light sources, such as laser diodes (LDs). Specifically, an image forming apparatus scans a charged scanning surface of a photoconductor rotating in the sub-scanning direction with a laser beam shaped by an optical system, such as a collimator lens, while deflecting the laser beam by a polygon mirror in the main-scanning direction, and forms an electrostatic latent image on the scanning surface of the photoconductor. The image forming apparatus forms a toner image by visualizing (developing) the electrostatic latent image formed on the scanning surface of the photoconductor with toner, transfers the toner image to a recording medium such as a printing sheet, and fixes the toner image to the recording medium, to thereby form a certain image.

As described above, in the image forming apparatuses, it is common to perform a process of forming an electrostatic latent image by applying beams to positions corresponding to portions where toner is to be attached on the scanning surface of the photoconductor, and thereafter developing the electrostatic latent image. However, the volume (amount) of the toner to be attached varies depending on the beam diameter of a beam that has reached the scanning surface or depending on other developing conditions. To form an appropriate image, a certain amount of toner is needed. However, if a uniform developing condition is applied, excess toner may be consumed in some cases.

As an image forming apparatus that suppresses toner consumption, there has been proposed an apparatus that extracts an edge portion of an image and sets the densities of pixels of the edge portion and the densities of pixels of portions other than the edge portion to different values (Japanese Laid-open Patent Publication No. 2002-86805). For example, the image forming apparatus described in Japanese Laid-open Patent Publication No. 2002-86805 sets the densities of the pixels of the edge portion to be smaller than the densities of the pixels of the portions other than the edge portion, thereby suppressing the toner consumption and clearly distinguishing the edge portion, that is, a contour, of the image.

Similarly, as an image forming apparatus that suppresses toner consumption, there has been proposed an apparatus that forms a contour image by extracting an edge portion of an image and setting the densities of pixels of portions other than the edge portion to zero or to be smaller than the densities of pixels of the edge portion (Japanese Patent No. 2773081).

In the image forming apparatus, desired print conditions may vary according to users, and it is required to exclusively perform print operation under each print condition. For example, it may be possible to exclusively switch between a print function, in which the densities of pixels of an edge portion of an image is reduced relative to the densities of pixels of a non-edge portion as described in Japanese Laid-open Patent Publication No. 2002-86805, and a print function, in which a contour image is extracted from an original image as described in Japanese Patent No. 2773081. However, if hardware is used to implement image processing for reducing the densities of the pixels of the edge portion of the image relative to the densities of the pixels of the non-edge portion and image processing for extracting the contour image from an original image, it is necessary to provide a separate hardware circuit for each image processing; therefore, the scale of the hardware increases.

The present invention has been conceived in view of the above circumstances, and there is a need for an integrated circuit, an image processing apparatus, and an image forming apparatus that suppress an increase in the scale of hardware for image processing.

SUMMARY OF THE INVENTION

It is an object of the present invention to at least partially solve the problems in the conventional technology.

There is provided an integrated circuit that includes a pixel identifying unit that extracts a target partial image formed of a pixel of interest and adjacent pixels from input image data, determines a character of the pixel of interest based on the pixel of interest and the adjacent pixels, and generates identification information indicating a result of determination on the character; and a density converting unit that converts a density of a pixel of the image data based on a contour extraction function or an edge density reducing function on the image data by using the identification information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an integrated circuit, an image processing apparatus, and an image forming apparatus according to the present invention will be described in detail below with reference to the accompanying drawings. As the image forming apparatus according to the embodiments, for example, an electrophotography image forming apparatus or multifunction peripheral (MFP) is applicable. The MFP is an apparatus having at least two of a print function, a copy function, a scanner function, and a facsimile function.

Further, the present invention is not limited to the embodiments below. Components in the embodiments described below include one that can be easily thought of by a person skilled in the art, one that is substantially identical, and one that is within an equivalent range. Furthermore, within the scope not departing from the gist of the following embodiments, various omission, replacement, and modifications of the components may be made.

Overall Configuration of Image Forming Apparatus

Figure 1:
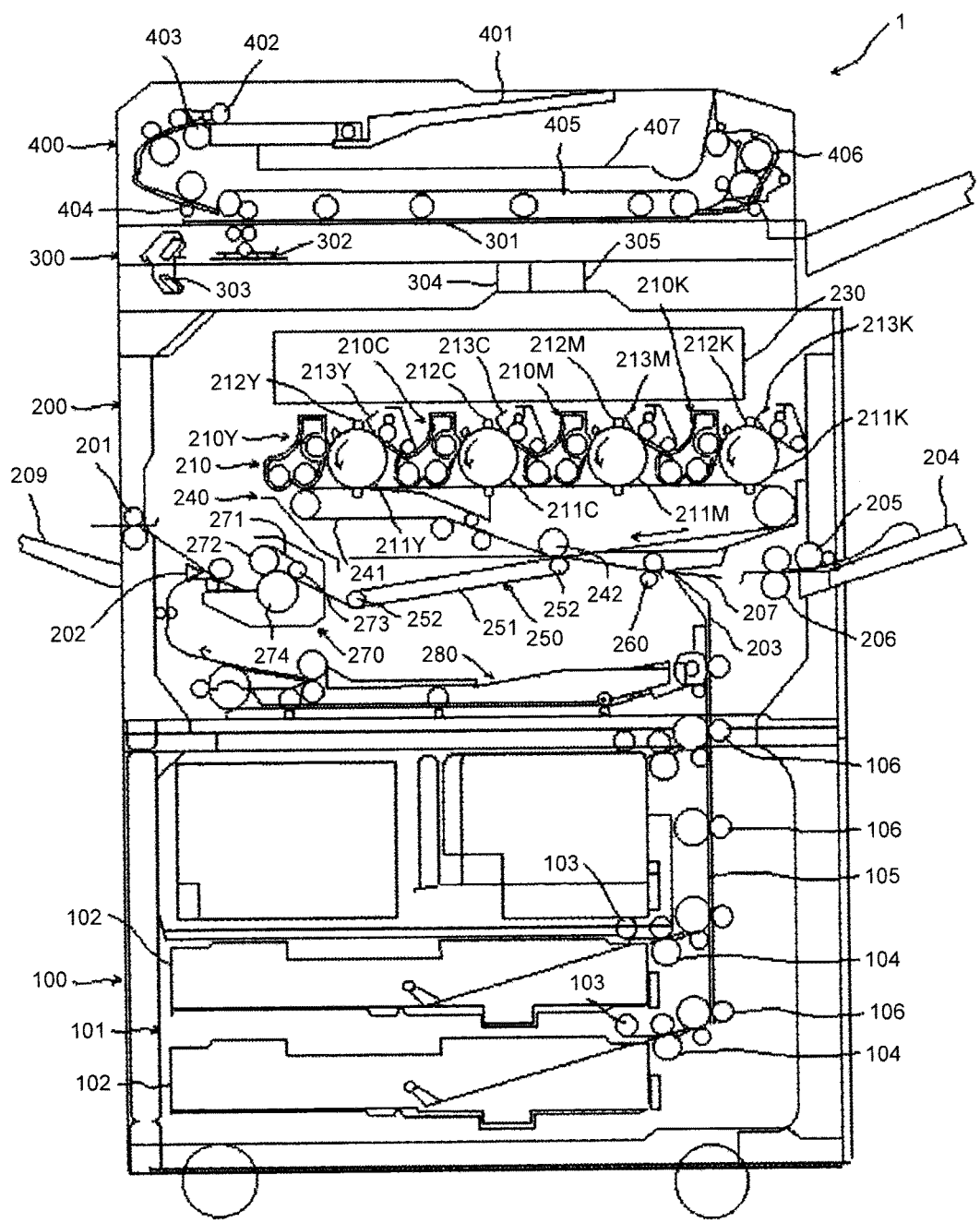
FIG. 1 is a diagram illustrating an example of an overall configuration of an image forming apparatus according to an embodiment.

FIG. 1 is a diagram illustrating an example of an overall configuration of an image forming apparatus according to an embodiment. With reference to FIG. 1, a configuration of the image forming apparatus 1 according to the embodiment will be described.

As illustrated in FIG. 1, the image forming apparatus 1 includes a paper feeding unit 100, a printer unit 200, a scanner unit 300, and an auto document feeder (ADF) 400. The image forming apparatus 1 has a layer structure, in which the paper feeding unit 100, the printer unit 200, the scanner unit 300, and the ADF 400 are stacked in this order from the bottom.

The paper feeding unit 100 is a section that feeds printing sheets for use in image formation to the printer unit 200. The paper feeding unit 100 includes a paper bank 101, paper feeding cassettes 102, paper feeding rollers 103, separation rollers 104, a paper feeding path 105, and conveying rollers 106.

The paper bank 101 houses a plurality of the paper feeding cassettes 102 in a stacked state. Each of the paper feeding cassettes 102 stores therein printing sheets of a different sheet size or a different sheet type. The paper feeding rollers 103 are rollers that are arranged for the respective paper feeding cassettes 102 and feed the printing sheets stored in the paper feeding cassettes 102 to the outside of the paper feeding cassettes 102. The separation rollers 104 are rollers that are arranged for the respective paper feeding cassettes 102, separates the printing sheets fed from the paper feeding rollers 103 one by one, and feeds each of the printing sheets. The paper feeding path 105 is a conveying path for conveying the printing sheets fed by the paper feeding rollers 103 and the separation rollers 104 from the paper feeding cassettes 102 to the printer unit 200. The conveying rollers 106 are rollers that convey the printing sheets to the printer unit 200 along the paper feeding path 105.

The paper feeding unit 100 starts paper feeding operation at approximately the same time as when the scanner unit 300 starts document reading operation, and selects and rotates one of the paper feeding rollers 103 to feed the printing sheets from one of the paper feeding cassettes 102 in the paper bank 101. The paper feeding unit 100 separates the fed sheets one by one by using the separation roller 104 to lead each of the sheets into the paper feeding path 105, and feeds each of the sheets to a paper feeding path 203 in the printer unit 200 by using the conveying rollers 106.

The printer unit 200 is a section that forms an image on a printing sheet fed from the paper feeding unit 100. The printer unit 200 includes a paper ejection roller 201, a switching claw 202, the paper feeding path 203, a manual feed tray 204, a paper feeding roller 205, a separation roller 206, a manual paper feeding path 207, a stacker 209, an image forming unit 210, an optical writing unit 230 (optical writing means), an intermediate transfer unit 240, a secondary transfer unit 250, a registration roller 260, a fixing unit 270, and a paper reversing unit 280.

The paper ejection roller 201 is a roller that stacks printing sheets, on which images are formed through the fixing unit 270, onto the stacker 209. The switching claw 202 is a member that switches between a conveying path for conveying the printing sheets, on which the images are formed through the fixing unit 270, to the paper ejection roller 201 and a conveying path for conveying the printing sheets to the paper reversing unit 280. The paper feeding path 203 is a conveying path that receives the printing sheets fed from the paper feeding unit 100 and conveys the printing sheets to the registration roller 260. The manual feed tray 204 is a tray that feeds printing sheets, and is arranged on the side surface of the printer unit 200. The paper feeding roller 205 is a roller that feeds the printing sheets placed on the manual feed tray 204. The separation roller 206 is a roller that separates the printing sheets fed from the paper feeding roller 205 one by one and feeds each of the printing sheets. The manual paper feeding path 207 is a conveying path for conveying the printing sheets fed from the manual feed tray 204 through the paper feeding roller 205 and the separation roller 206 to the registration roller 260. The stacker 209 is a member arranged on the side surface of the printer unit 200, and holds the printing sheets ejected by the paper ejection roller 201 in a stacked manner.

The image forming unit 210 includes four process cartridges 210Y, 210C, 210M, 210K to form images of four respective colors of yellow (Y), cyan (C), magenta (M), and black (K). The process cartridges 210Y, 210C, 210M, 210K include photoconductors 211Y, 211C, 211M, 211K, charging units 212Y, 212C, 212M, 212K, developing devices 213Y, 213C, 213M, 213K, drum cleaning devices, and neutralizing units, respectively. Hereinafter, when the photoconductors 211Y, 211C, 211M, 211K need not be distinguished from one another or when they are collectively described, they are referred to as the "photoconductor(s) 211".

The charging units 212Y, 212C, 212M, 212K are charging rollers to which alternating-current voltages are applied, and uniformly charge the photoconductors 211Y, 211C, 211M, 211K by coming in sliding contact with the photoconductors 211Y, 211C, 211M, 211K, respectively. The charging units 212Y, 212C, 212M, 212K are not limited to the charging rollers, and may be those that bring other members, such as charging brushes, to come in contact with the photoconductors 211Y, 211C, 211M, 211K. Alternatively, a non-contact charging system, such as a scorotron charger, may be used.

The developing devices 213Y, 213C, 213M, 213K supply toner of the respective colors to the photoconductors 211Y, 211C, 211M, 211K on which electrostatic latent images are formed, in order to develop the electrostatic latent images, thereby forming toner images of the respective colors.

The photoconductors 211Y, 211C, 211M, 211K are formed in drum shapes for example, in each of which a base tube made of aluminum or the like is covered with a photosensitive layer made of organic photoconductive material with photosensitivity, and the surfaces thereof are charged by the charging units 212Y, 212C, 212M, 212K, respectively. Further, the optical writing unit 230 irradiates the photoconductors 211Y, 211C, 211M, 211K with laser beams (hereinafter, simply referred to as "laser light"), which are modulated and deflected based on pieces of image data of the respective colors, so that electrostatic latent images of the respective colors are formed on the charged surfaces. Furthermore, the developing devices 213Y, 213C, 213M, 213K supply toner to the photoconductors 211Y, 211C, 211M, 211K, respectively, so that the electrostatic latent images are developed into toner images. Moreover, the photoconductors 211Y, 211C, 211M, 211K transfer the formed toner images to an intermediate transfer belt 241 to be described later (primary transfer). Meanwhile, the shapes of the photoconductors 211 are not limited to the drum shapes, and may be, for example, belt-like shapes.

The drum cleaning devices included in the image forming unit 210 are devices that remove toner remaining on the photoconductors 211 after the transfer is completed. The neutralizing units included in the image forming unit 210 are devices that neutralize the photoconductors 211 from which the toner has been removed by the drum cleaning devices.

The optical writing unit 230 is, as will be described later, a device that irradiates the surfaces of the photoconductors 211 of the respective colors with laser light modulated based on pieces of image data of the respective colors, to thereby form electrostatic latent images of respective color images on the photoconductors 211. The optical writing unit 230 is provided for each of the photoconductors 211 (the photoconductors 211Y, 211C, 211M, 211K). The configuration and operation of the optical writing unit 230 will be described in detail later with reference to FIG. 2 and FIG. 3.

The intermediate transfer unit 240 is a unit that transfers, as secondary transfer, the color toner images to a printing sheet. The intermediate transfer unit 240 includes the intermediate transfer belt 241, a secondary transfer backup roller 242 for stretching the intermediate transfer belt 241 together with a plurality of tension rollers, four intermediate transfer bias rollers arranged in positions opposite to the photoconductors 211 across the intermediate transfer belt 241, and the like.

The intermediate transfer belt 241 is a belt stretched by tension of the secondary transfer backup roller 242 and a plurality of the tension rollers. The intermediate transfer belt 241 endlessly moves in a rotating manner in the direction of an arrow illustrated in FIG. 1 with rotation of at least one of the tension rollers driven by a belt driving motor (not illustrated). On the intermediate transfer belt 241, the toner images on the photoconductors 211 are sequentially superimposed one on top of the other (four colors in FIG. 1) when intermediate transfer biases are applied to the intermediate transfer bias rollers by a power source (not illustrated), so that a color toner image is transferred. The intermediate transfer belt 241 transfers, as the secondary transfer, the transferred color toner image to a printing sheet at a secondary transfer nip to be described later.

The secondary transfer unit 250 is arranged below the intermediate transfer unit 240, and includes a paper conveying belt 251 and two tension rollers 252 for stretching the paper conveying belt 251.

The paper conveying belt 251 is a belt stretched by tension of the two tension rollers 252. The paper conveying belt 251 endlessly moves in a rotating manner with rotation of at least one of the tension rollers 252 driven by a belt driving motor (not illustrated).

One of the two tension rollers 252 and the secondary transfer backup roller 242 of the intermediate transfer unit 240 sandwich the intermediate transfer belt 241 and the paper conveying belt 251. Therefore, the secondary transfer nip is formed, at which the intermediate transfer belt 241 of the intermediate transfer unit 240 and the paper conveying belt 251 of the secondary transfer unit 250 come in contact with each other. A secondary transfer bias with the polarity opposite to the toner is applied to the tension roller 252 on the secondary transfer backup roller 242 side by a power source (not illustrated). At the secondary transfer nip, upon application of the secondary transfer bias to the tension roller 252, a secondary transfer electric field is formed, by which the color image on the intermediate transfer belt 241 is electrostatically moved from the intermediate transfer belt 241 to the tension roller 252 on the secondary transfer backup roller 242 side.

The registration roller 260 is a roller arranged on the upstream side in the moving direction of the intermediate transfer belt 241, relative to the secondary transfer nip. The registration roller 260 feeds a printing sheet (recording medium) fed from the paper feeding path 203 or the manual paper feeding path 207 to the secondary transfer nip in synchronization with the color toner image on the intermediate transfer belt 241. On the printing sheet fed to the secondary transfer nip by the registration roller 260, the color toner image is secondary transferred with the aid of the secondary transfer electric field and a nip pressure of the secondary transfer nip. The printing sheet, on which a full-color image is formed through the secondary transfer, is output from the secondary transfer nip and conveyed to the fixing unit 270 along with endless rotational movement of the paper conveying belt 251.

The fixing unit 270 is a device that heats the printing sheet subjected to the secondary transfer at the secondary transfer nip, and fixes the color toner image to the printing sheet. The fixing unit 270 includes a fixing belt 271, a heating roller 272, a driven roller 273, and a pressing roller 274.

The fixing belt 271 is a belt stretched by tension of the heating roller 272 and the driven roller 273. The fixing belt 271 endlessly moves in a rotating manner with rotation of the heating roller 272 driven by a belt driving motor (not illustrated).

The heating roller 272 is a roller that includes a heat source (not illustrated) and endlessly moves the fixing belt 271 in a rotating manner with the rotation thereof. The heating roller 272 is pressed against the pressing roller 274 across the fixing belt 271, so that a fixing nip is formed. The heating roller 272 heats the printing sheet fed to the fixing nip by the fixing belt 271 by using the heat source, so that the color toner image is fixed to the printing sheet to form a certain image.

The driven roller 273 is a roller that stretches the fixing belt 271 together with the heating roller 272 and rotates with rotation of the heating roller 272. The pressing roller 274 is a roller that presses the heating roller 272 across the fixing belt 271 to form the fixing nip.

The paper reversing unit 280 is a unit that is arranged below the fixing unit 270, causes the printing sheet, which has been conveyed through the conveying path switched by the switching claw 202 and on which the image is formed through the fixing unit 270, to be turned upside down, and conveys the printing sheet to the secondary transfer nip again. The printing sheet turned upside down by the paper reversing unit 280 is subjected to the secondary transfer at the secondary transfer nip to form a color toner image on the other side (back side), and thereafter conveyed to the fixing unit 270.

As described above, the printer unit 200 conveys a printing sheet fed from the paper feeding path 203 or the manual paper feeding path 207 to the secondary transfer nip through the registration roller 260. Then, the printer unit 200 secondarily transfers a color toner image to the printing sheet at the secondary transfer nip, fixes the color toner image to the printing sheet in the fixing unit 270, and stacks the printing sheet on the stacker 209 through the paper ejection roller 201 or conveys the printing sheet to the paper reversing unit 280.

The scanner unit 300 is a section that reads an image of a document. The scanner unit 300 includes a contact glass 301, a first scanning body 302, a second scanning body 303, an imaging forming lens 304, and a charge coupled device (CCD) 305.

The contact glass 301 is a glass table on which a document to be read by the CCD 305 is placed.

The first scanning body 302 and the second scanning body 303 are arranged below the contact glass 301 and are movable in the sub-scanning direction (in the left-right direction with respect to the sheet of FIG. 1). The first scanning body 302 includes a light source and a first mirror (not illustrated). The second scanning body 303 includes a second mirror and a third mirror (not illustrated). The light source of the first scanning body 302 irradiates a document placed on the contact glass 301 with reading light. The first mirror of the first scanning body 302 reflects the reflected reading light from the document toward the second mirror of the second scanning body 303. The second mirror of the second scanning body 303 reflects the reflected light from the first mirror toward the third mirror of the second scanning body 303. The third mirror of the second scanning body 303 reflects the reflected light from the second mirror toward the imaging forming lens 304.

The imaging forming lens 304 receives the reflected light incident from the third mirror, and condenses the incident light onto the CCD 305. The CCD 305 performs photoelectric conversion on the light condensed by the imaging forming lens 304 and reads an image of the document.

The ADF 400 is a device that automatically feeds documents placed thereon to the contact glass 301. The ADF 400 is arranged in the upper portion of a housing of the image forming apparatus 1 and is openable and closeable with respect to the contact glass 301. The ADF 400 includes a document table 401, a paper feeding roller 402, a separation roller 403, a conveying roller 404, a conveying belt 405, a paper ejection roller 406, and a paper ejection table 407.

The document table 401 is a table for placing documents whose images are to be read by the scanner unit 300. The paper feeding roller 402 is a roller that feeds the documents placed on the document table 401 to the inside of the ADF 400 when reading operation is performed while the ADF 400 is closed. The separation roller 403 is a roller that separates the documents fed by the paper feeding roller 402 one by one and feeds each of the documents to the conveying roller 404. The conveying roller 404 is a roller that conveys the document fed by the separation roller 403 to the conveying belt 405.

The conveying belt 405 is a belt that conveys and sets the document fed by the conveying roller 404 to a read position on the contact glass 301. The conveying belt 405 conveys the document on the contact glass 301 to the paper ejection roller 406 when the scanner unit 300 completes the document reading operation.

The paper ejection roller 406 is a roller that ejects the document conveyed by the conveying belt 405 to the paper ejection table 407. The paper ejection table 407 is a table, on which the document that has been read by the scanner unit 300 and ejected by the paper ejection roller 406 is stacked.

The ADF 400 exposes the upper surface of the contact glass 301 by being opened and allows a document to be set on the contact glass 301. The ADF 400, when being closed while a document is set on the contact glass 301, functions as a pressing member that presses the document against the contact glass 301.

Configuration of Optical Writing Unit

Figure 2:
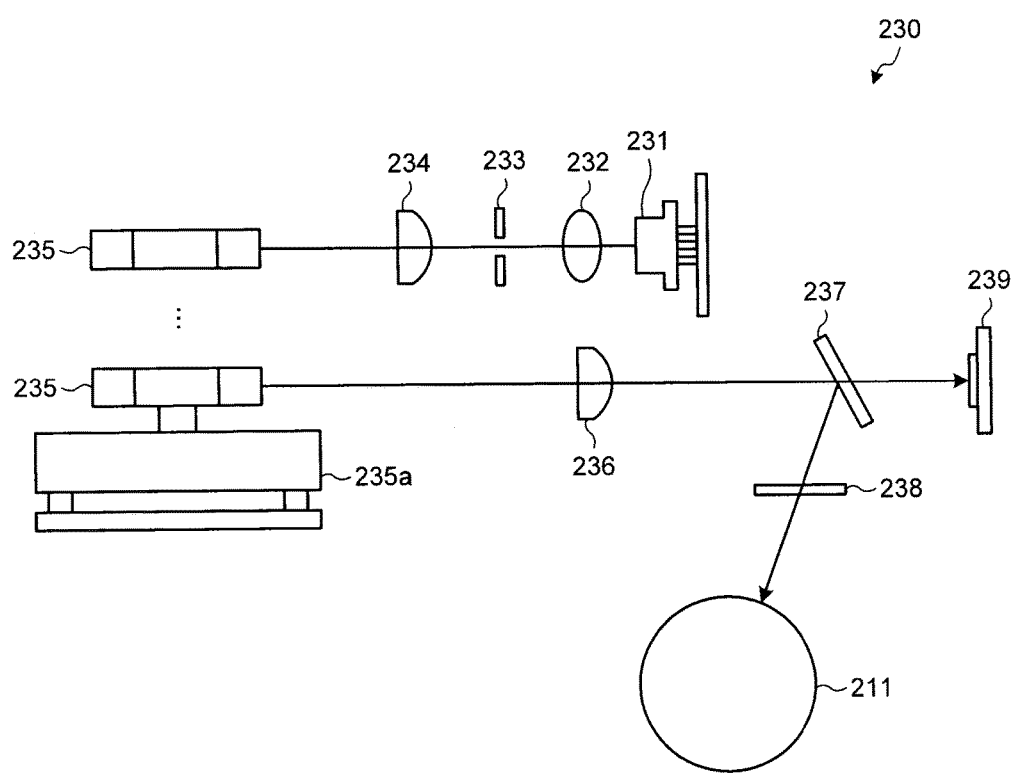
FIG. 2 is a schematic diagram illustrating an example of arrangement of components of an optical writing unit.
Figure 3:
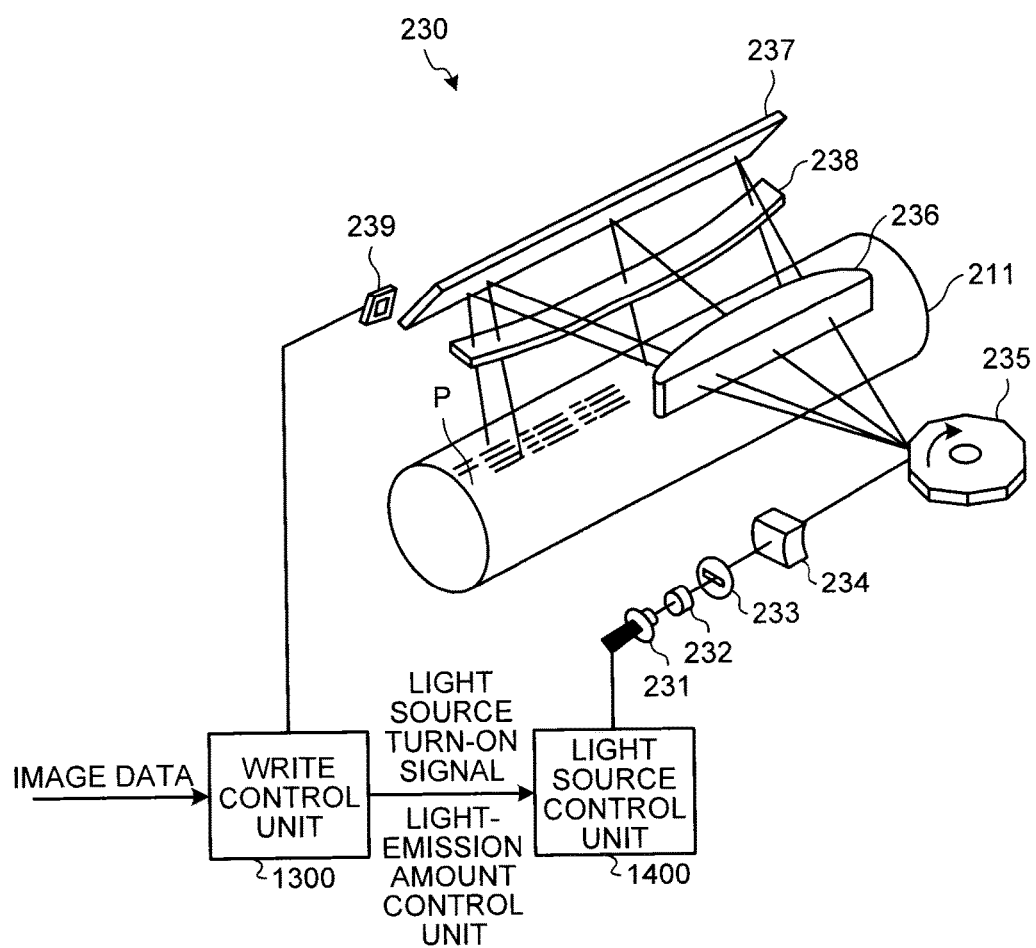
FIG. 3 is an external perspective view of the optical writing unit.

FIG. 2 is a schematic diagram illustrating an example of arrangement of components of the optical writing unit. FIG. 3 is an external perspective view of the optical writing unit. With reference to FIG. 2 and FIG. 3, the configuration of the optical writing unit 230 will be described.

As illustrated in FIG. 2 and FIG. 3, the optical writing unit 230 includes a laser diode (LD) unit 231 (light source), a collimator lens 232, an aperture 233, a cylindrical lens 234, a polygon mirror 235, a polygon motor 235a, an fθ lens 236, a reflecting mirror 237, a dust-proof glass 238, and a synchronization detection sensor 239.

The LD unit 231 is a unit that emits a semiconductor laser. A light source control unit 1400, which will be described below, controls operation of turning on or off the laser light of the LD unit 231, to thereby control the amount of the laser light. The laser light emitted by the LD unit 231 reaches the photoconductor 211 through each of optical systems to be described below.

The collimator lens 232 is a lens that collimates the laser light emitted by the LD unit 231 by using refraction. The aperture 233 is a member with a diaphragm function to transmit a predetermined light beam of the collimated laser light that has passed through the collimator lens 232. The cylindrical lens 234 has a shape obtained by cutting a part of a side surface of a cylinder, in which an incident surface is a curved surface like the side surface of the cylinder and an output surface is a flat surface. The cylindrical lens 234 linearly condenses the laser light that has entered the incident surface through the aperture 233, and outputs the condensed light from the output surface. In this manner, the laser light emitted by the LD unit 231 is shaped by the collimator lens 232, the aperture 233, and the cylindrical lens 234 in a predetermined shape.

The polygon mirror 235 is a rotary polygon mirror that rotates by drive of the polygon motor 235a and has a polygonal prism shape when viewed in a rotation axis direction. The polygon mirror 235 rotates at a predetermined rotation speed and reflects (deflects) the laser light that has entered through the cylindrical lens 234 toward the fθ lens 236 to repeatedly move the laser light for scanning in the main-scanning direction (an axis direction of the photoconductor 211). While the polygon mirror 235 is divided into the incident side and the reflecting side in FIG. 2, these sides form the same polygon mirror.

The fθ lens 236 is a lens that allows the photoconductor 211 to be scanned at a constant speed with the laser light, which is reflected by the polygon mirror 235 for scanning at a constant angular velocity. In reality, the laser light that has been reflected by the polygon mirror 235 and passed through the fθ lens 236 is reflected by the reflecting mirror 237, passes through the dust-proof glass 238, and is focused into a spot with a predetermined beam diameter on the photoconductor 211. In this manner, the photoconductor 211 is repeatedly scanned in the main-scanning direction with the laser light through the polygon mirror 235 and the fθ lens 236, so that an electrostatic image is formed on the photoconductor 211. Meanwhile, it may be possible to arrange a barrel troidal lens (optical face tangle error correction lens) between the fθ lens 236 and the reflecting mirror 237. By arranging the barrel troidal lens, even when the laser light reflected by the polygon mirror 235 is deviated from the sub-scanning direction due to the inclination of the reflection surface of the polygon mirror 235, it becomes possible to focus the laser light on the same position on the photoconductor 211.

The synchronization detection sensor 239 is a sensor that is arranged on the outside of an area where the laser light is written to the surface of the photoconductor 211 in the main-scanning direction, and on a side of a start point where the scanning with the laser light in the main-scanning direction starts. The synchronization detection sensor 239 detects laser light, which is reflected by the polygon mirror 235 immediately before being used for scanning of the photoconductor 211 in the main-scanning direction, generates a synchronizing signal at the timing of the detection, and outputs the synchronizing signal to a write control unit 1300 to be described later.

As described above, the laser light emitted by the LD unit 231 reaches the photoconductor 211 through the collimator lens 232, the aperture 233, the cylindrical lens 234, the polygon mirror 235, the fθ lens 236, the reflecting mirror 237, and the dust-proof glass 238 in this order, and an electrostatic latent image of a corresponding color is formed on the photoconductor 211.

Block Configuration of Image Forming Apparatus

Figure 4:
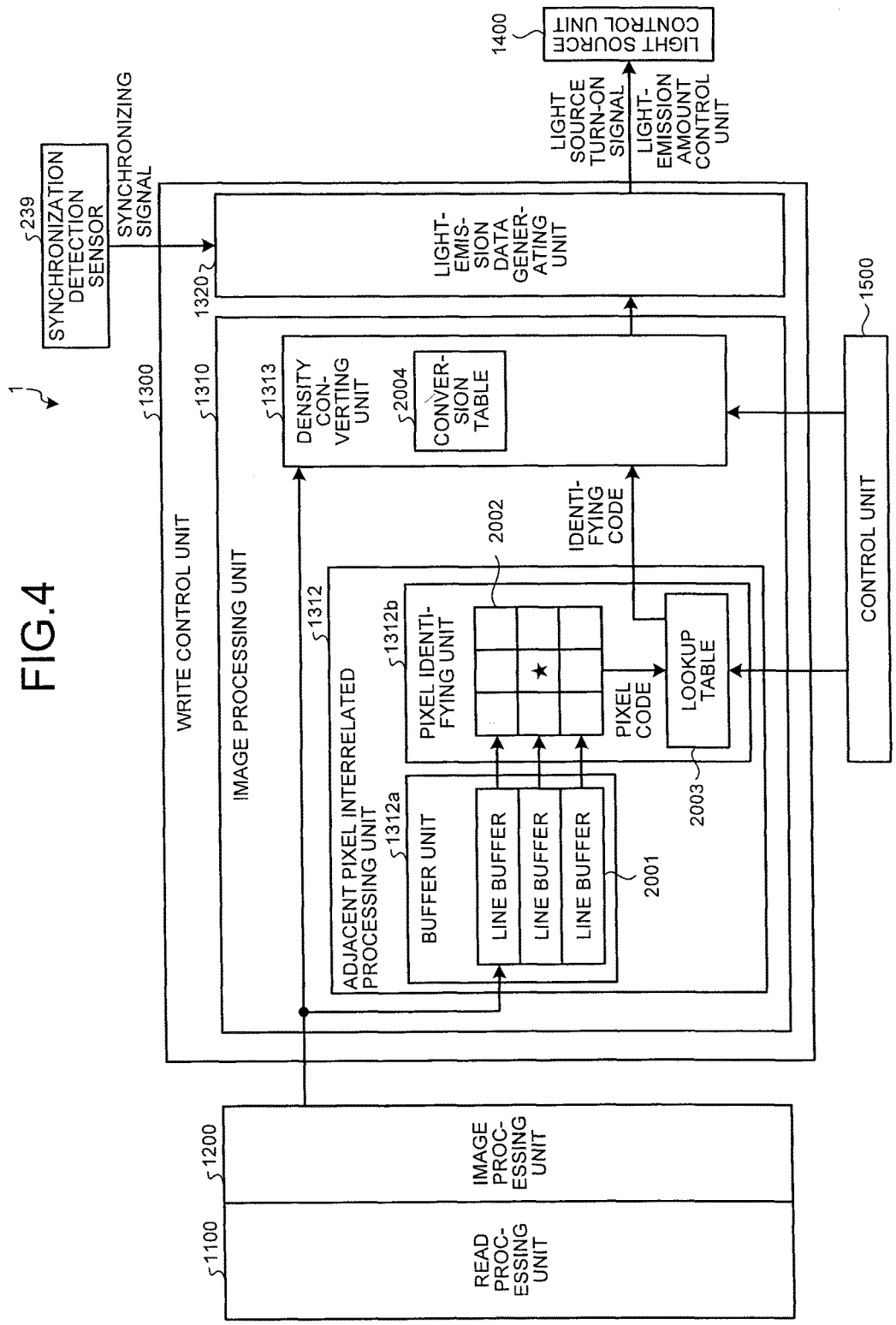
FIG. 4 is a diagram illustrating an example of a block configuration of the image forming apparatus according to the embodiment.

FIG. 4 is a diagram illustrating an example of a block configuration of the image forming apparatus according to the embodiment. With reference to FIG. 4, a block configuration of main components of the image forming apparatus 1 according to the embodiment will be described.

As illustrated in FIG. 4, the image forming apparatus 1 includes a read processing unit 1100, an image processing unit 1200, a write control unit 1300 (image processing apparatus), the light source control unit 1400 (light source control means), and a control unit 1500 (control means).

The read processing unit 1100 is a processing unit that performs data processing on image data read by the scanner unit 300. Specifically, the read processing unit 1100 performs sampling processing, analog-to-digital (A/D) conversion processing, shading processing, or the like on analog image data subjected to the photoelectric conversion by the CCD 305 as described above, and transmits the processed image data to the image processing unit 1200.

The image processing unit 1200 is a processing unit that performs image quality correction processing, such as magnification change processing, rotation processing, or edge processing, on the image data received from the read processing unit 1100, converts the image data to multivalued image data (CMYK data) (for example, 4-bit hexadecimal value), and transmits the multivalued image data to the write control unit 1300.

The write control unit 1300 is a processing unit that performs image processing based on at least a contour extraction function or an edge density reducing function on the image data received from the image processing unit 1200 as will be described below. The write control unit 1300 includes an image processing unit 1310 and a light-emission data generating unit 1320.

The image processing unit 1310 is a processing unit that adjusts densities of pixels of image data by performing the image processing based on the contour extraction function or the edge density reducing function as described above. The image processing unit 1310 includes an adjacent pixel interrelated processing unit 1312 and a density converting unit 1313 (density converting means).

The adjacent pixel interrelated processing unit 1312 is a processing unit that stores therein an image matrix of a pixel of interest and adjacent pixel, which will be described later, and performs pattern matching between the image matrix and a target partial image in the image data. The adjacent pixel interrelated processing unit 1312 includes a buffer unit 1312a and a pixel identifying unit 1312b (pixel identifying means).

The buffer unit 1312a includes a line buffer 2001 that temporarily stores therein image data received from the image processing unit 1200. As illustrated in FIG. 4, the line buffer 2001 can store therein, for example, three horizontal pixel lines of image data.

The pixel identifying unit 1312b receives (extracts), for example, a target partial image with the number of taps of 3×3 from the line buffer 2001 of the buffer unit 1312a. The pixel identifying unit 1312b generates a pixel code (pixel information) for discriminating between a pixel of interest and adjacent pixels in a group of pixels of the target partial image by performing a pattern matching between the target partial image and an image matrix 2002 stored therein. The pixel identifying unit 1312b includes a lookup table 2003 (identification conversion information). The lookup table 2003 is a table in which, for example, the pixel code is associated with an identification code indicating what the pixel of interest is like. The pixel identifying unit 1312b generates the identification code by acquiring the identification code corresponding to the pixel code from the lookup table 2003, and sends the identification code to the density converting unit 1313. The pixel identifying unit 1312b is realized by a hardware circuit (integrated circuit), such as an application specific integrated circuit (ASIC). The configuration using the hardware circuit, such as an ASIC, is not limited to the pixel identifying unit 1312b, and may be applied to, for example, the entire adjacent pixel interrelated processing unit 1312. In the lookup table 2003, the pixel code and the identification code are associated in a table format; however it is not limited thereto, and any type of information is applicable as long as the information associates the pixel code with the identification code.

The density converting unit 1313 is a processing unit that converts the density of a pixel of the image data received from the image processing unit 1200 on the basis of the identification code received from the adjacent pixel interrelated processing unit 1312. The density converting unit 1313 includes a conversion table 2004 (density conversion information). The conversion table 2004 is a table in which, for example, the identification code is associated with the density of a pixel. The density converting unit 1313 acquires, from the conversion table 2004, the density of the pixel (pixel of interest) corresponding to the identification code of the received image data, and converts a pixel value so as to match the acquired density. The density converting unit 1313 transmits the image data with the converted pixel value to the light-emission data generating unit 1320. The density converting unit 1313 is realized by a hardware circuit (integrated circuit), such as an ASIC. Meanwhile, in the conversion table 2004, the identification code and the density of a pixel are associated in a table format; however, it is not limited thereto, and any type of information is applicable as long as the information associates the identification code with the density of a pixel.

The light-emission data generating unit 1320 generates a light source turn-on signal (light source control signal) and a light-emission amount control signal (light source control signal) based on the image data received from the density converting unit 1313 and based on the synchronizing signal received from the synchronization detection sensor 239, and transmits the signals to the light source control unit 1400.

The light source control unit 1400 receives the light source turn-on signal and the light-emission amount control signal from the light-emission data generating unit 1320, and controls operation of turning on or off the laser light of the LD unit 231 based on the signals to thereby control the amount of laser light. The control unit 1500 controls each of the units of the image forming apparatus 1 to control the entire operation of the image forming apparatus 1. The control unit 1500 updates data in the above described lookup table 2003 of the adjacent pixel interrelated processing unit 1312 as necessary. Further, the control unit 1500 updates data in the conversion table 2004 of the density converting unit 1313 depending on whether the image processing unit 1310 performs the image processing based on the contour extraction function on the image data or performs the image processing based on the edge density reducing function on the image data.

Details of the operation of the image processing based on the contour extraction function or the edge density reducing function by the image processing unit 1310 will be described later.

Hardware Configuration of Image Forming Apparatus

Figure 5:
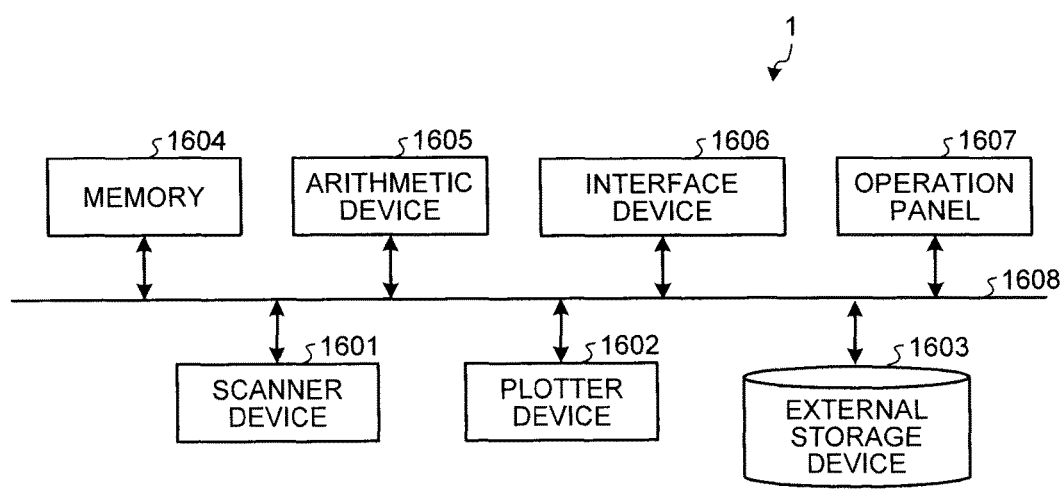
FIG. 5 is a diagram illustrating an example of a hardware configuration of the image forming apparatus according to the embodiment.

FIG. 5 is a diagram illustrating an example of a hardware configuration of the image forming apparatus according to the embodiment. With reference to FIG. 5, a hardware configuration of the image forming apparatus 1 according to the embodiment will be described.

As illustrated in FIG. 5, the image forming apparatus 1 includes a scanner device 1601, a plotter device 1602, an external storage device 1603, a memory 1604, an arithmetic device 1605, an interface device 1606, and an operation panel 1607, all of which are connected to one another via a bus 1608.

The scanner device 1601 includes a scanner engine in the scanner unit 300, an engine control unit that controls the scanner engine, and the like. The plotter device 1602 includes a printer engine in the printer unit 200, an engine control unit that controls the printer engine, and the like.

The external storage device 1603 stores therein an installed image formation program, necessary files and data, and the like. The external storage device 1603 is realized by a hard disk drive (HDD), a solid state drive (SSD), or the like.

The memory 1604 reads the image formation program from the external storage device 1603 and stores therein the image formation program when the image forming apparatus 1 starts up, and also functions as a working area (work area) of the arithmetic device 1605. The memory 1604 is realized by a random access memory (RAM) or the like.

The arithmetic device 1605 executes the image formation program loaded on the memory 1604, and controls the entire operation of the image forming apparatus 1. The arithmetic device 1605 functions as the control unit 1500 in the block configuration illustrated in FIG. 4. The arithmetic device 1605 is realized by, for example, a central processing unit (CPU).

The interface device 1606 is a device connected to an external network or the like and communicates with an external apparatus, such as a client personal computer (PC). The interface device 1606 is realized by, for example, a modem, a network interface card (NIC), or the like.

The operation panel 1607 is a device that accepts input of various types of operation performed by the user, and displays various types of information (for example, information according to accepted input of operation, information indicating an operating status of the image forming apparatus 1, information indicating a setting status, and the like). The operation panel 1607 is realized by a liquid crystal display (LCD) with a touch panel function, or the like.

Image Processing Operation

Figure 6:
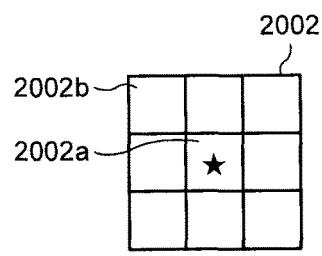
FIG. 6 is a diagram illustrating an example of an image matrix for identifying a type of a pixel of interest.
Figure 7A:
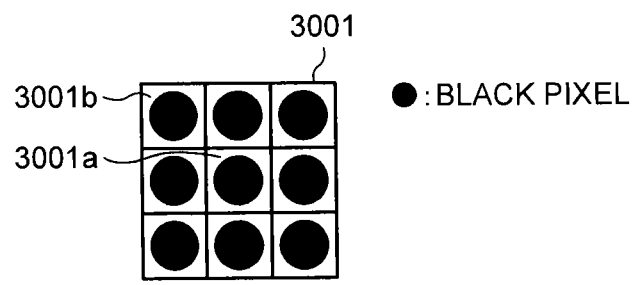
FIGS. 7A to 7C are diagrams for explaining an example of a method of identifying a type of a pixel of interest of a target partial image.
Figure 7B:
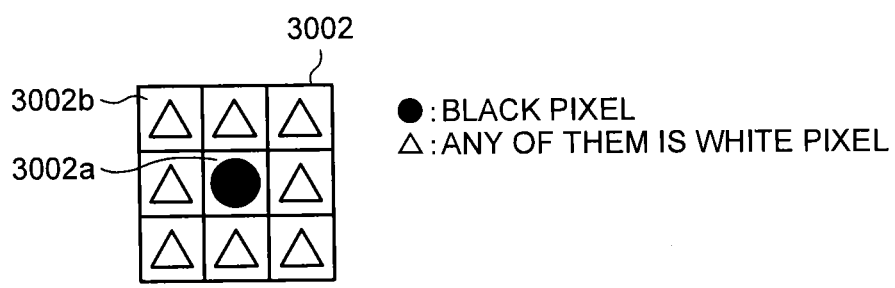
Figure 7C:
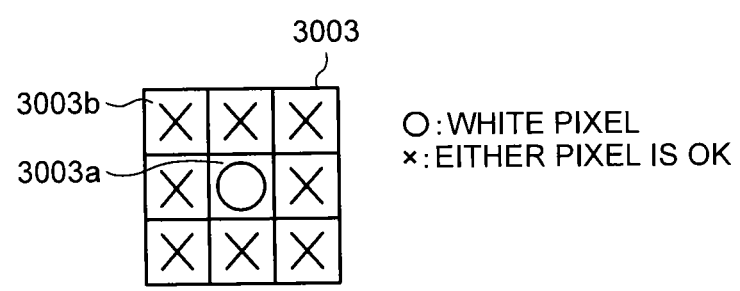

FIG. 6 is a diagram illustrating an example of the image matrix for identifying a type of a pixel of interest. FIGS. 7A to 7C are diagrams for explaining an example of a method of identifying a type of a pixel of interest of a target partial image. With reference to FIG. 6 and FIGS. 7A to 7C, an explanation is given of a process performed by the adjacent pixel interrelated processing unit 1312 to determine a character of a pixel (character determination) in order to determine what a pixel of interest of a target partial image is like in the image processing performed by the image processing unit 1310.

The buffer unit 1312a of the adjacent pixel interrelated processing unit 1312 stores, in the line buffer 2001, only three horizontal pixel lines of the multivalued image data received from the image processing unit 1200. It is assumed here that the multivalued image data is formed of, for example, pixels with 4-bit hexadecimal values. The pixel identifying unit 1312b of the adjacent pixel interrelated processing unit 1312 receives, from the buffer unit 1312a, for example, a target partial image with the number of taps of 3×3 (a part of the image data from the image processing unit 1200).

The pixel identifying unit 1312b generates a pixel code for discriminating between a pixel of interest and adjacent pixels in a group of pixels of the target partial image by performing a pattern matching between the target partial image received from the buffer unit 1312a and the image matrix 2002 stored therein. The image matrix 2002 is formed of, as illustrated in FIG. 6, a pixel of interest 2002a that is a central pixel of the matrix of 3×3 and adjacent pixels 2002b that are other pixels around the pixel of interest 2002a. Specifically, the pixel identifying unit 1312b performs a pattern matching with the image matrix 2002, determines a pixel corresponding to the pixel of interest 2002a as a pixel of interest and pixels corresponding to the adjacent pixels 2002b as adjacent pixels, and generates a pixel code. In the target partial image formed of 3×3 pixels with 4-bit values, the three pixels in the upper stage are referred to as an "upper left pixel", an "upper pixel", and an "upper right pixel" from the left, three pixels in the middle stage are referred to as a "left pixel", a "middle pixel", and a "right pixel" from the left, and three pixels in the lower stage are referred to as a "lower left pixel", a "lower pixel", and a "lower right pixel" from the left. For example, the pixel identifying unit 1312b generates a pixel code with pixels arranged in order of the "upper left pixel", the "upper pixel", the "upper right pixel", the "left pixel", the "middle pixel", the "right pixel", the "lower left pixel", the "lower pixel", the "lower right pixel" from the target partial image based on the pattern matching with the image matrix 2002.

The pixel identifying unit 1312b performs the character determination to determine what the pixel of interest of the target partial image is like based on the generated pixel code, and generates an identification code (identification information) as a result of the character determination. Specifically, as described above, the pixel identifying unit 1312b generates the identification code by acquiring the identification code corresponding to the pixel code from the lookup table 2003. In this manner, the pixel identifying unit 1312b acquires an identification code corresponding to the pixel code of the target partial image by using the lookup table 2003; however, if the lookup table 2003 is not used, for example, operation as described below is performed.

First, the pixel identifying unit 1312b determines whether each of the pixels (the pixel of interest and the adjacent pixels) of the target partial image is a "black pixel" or a "white pixel" by comparison with a predetermined threshold. It is assumed here that, for example, the "black pixel" indicates a pixel with a density corresponding to a pixel value equal to or greater than the predetermined threshold, and the "white pixel" indicates a pixel with a density corresponding to a pixel value smaller than the predetermined threshold. FIG. 7A illustrates a target partial image 3001, in which a pixel of interest 3001a as a central pixel is a "black pixel" and adjacent pixels 3001b around the pixel of interest 3001a are "black pixels". FIG. 7B illustrates a target partial image 3002, in which a pixel of interest 3002a as a central pixel is a "black pixel" and at least one of adjacent pixels 3002b around the pixel of interest 3002a is a "white pixel". FIG. 7C illustrates a target partial image 3003, in which a pixel of interest 3003a as a central pixel is a "white pixel" and adjacent pixels 3003b around the pixel of interest 3003a are either "black pixels" or "white pixels".

If a target partial image is the target partial image 3001 illustrated in FIG. 7A, the pixel identifying unit 1312b determines the character such that the pixel of interest (the pixel of interest 3001a) of the target partial image is a pixel corresponding to an edge portion of an image element contained in the image of the image data received from the image processing unit 1200. Specifically, when it is determined that all of the pixels of the target partial image are "black pixels", the pixel identifying unit 1312b determines the character such that the pixel of interest of the target partial image is a pixel corresponding to the edge portion.

Further, if a target partial image is the target partial image 3002 illustrated in FIG. 7B, the pixel identifying unit 1312b determines the character such that the pixel of interest (the pixel of interest 3002a) of the target partial image is a pixel corresponding to a non-edge portion that is not the edge of the image element contained in the image of the image data received from the image processing unit 1200. Specifically, when it is determined that the pixel of interest is a "black pixel" and at least one of the adjacent pixels is a "white pixel" among the pixels of the target partial image, the pixel identifying unit 1312b determines the character such that the pixel of interest of the target partial image is a pixel corresponding to the non-edge portion.

Furthermore, if a target partial image is the target partial image 3003 illustrated in FIG. 7C, the pixel identifying unit 1312b determines the character such that the pixel of interest (the pixel of interest 3003a) of the target partial image is a pixel corresponding to a non-image portion that is not contained in the image element contained in the image of the image data received from the image processing unit 1200. Specifically, when it is determined that the pixel of interest is a "white pixel" among the pixels of the target partial image, the pixel identifying unit 1312b determines the character such that the pixel of interest of the target partial image is a pixel corresponding to the non-image portion.

A method of determining the character of the pixel of interest of the target partial image by the pixel identifying unit 1312b is not limited to the method as described above. For example, in the above described method of determining the "non-image portion", the character is determined such that the pixel of interest among the pixels of the target partial image corresponds to the "non-image portion" when the pixel of interest is determined as a "white pixel"; however, it is not limited thereto. For example, even when the pixel of interest is a "white pixel", if five or more of the adjacent pixels among the pixels of the target partial image are determined as "black pixels", the character may be determined such that the pixel of interest corresponds to the "non-edge portion" (image portion).

The pixel identifying unit 1312b generates an identification code for indicating a result of the above described character determination on the pixel of interest of the target partial image by using, for example, a 2-bit value. For example, when the pixel of interest of the target partial image is the "edge portion", the pixel identifying unit 1312b generates a 2-bit identification code indicating "1". Further, when the pixel of interest of the target partial image is the "non-edge portion", the pixel identifying unit 1312b generates a 2-bit identification code indicating "2". Furthermore, when the pixel of interest of the target partial image is the "non-image portion", the pixel identifying unit 1312b generates a 2-bit identification code indicating "3".

As described above, the pixel identifying unit 1312b performs the character determination to determine what the pixel of interest is like based on the target partial image, generates an identification code as a result of the character determination, and sends the identification code to the density converting unit 1313. Incidentally, in the embodiment, the pixel identifying unit 1312b can simplify the process of generating the identification code from the pixel code by using the lookup table 2003.

In the above described operation, whether each of the pixels is a "black pixel" or a "white pixel" is determined based on the pixel value contained in the pixel code; however, it is not limited thereto. Specifically, the pixel identifying unit 1312b may determine, in advance, whether each of the pixels of the target partial image received from the buffer unit 1312a is a "black pixel" or a "white pixel" by comparison with a predetermined threshold, and generate a pixel code based on data indicating the "black pixel" or the "white pixel". More specifically, for example, the pixel identifying unit 1312b may determine whether each of nine pixels of a 3×3 target partial image is a "black pixel" or a "white pixel", replaces data of each of the pixels with 1-bit data indicating the "black pixel" or the "white pixel" (for example, "0" indicates the white pixel and "1" indicates the black pixel), and generate a pixel code (pixel information) by 9-bit data.

Figure 8:
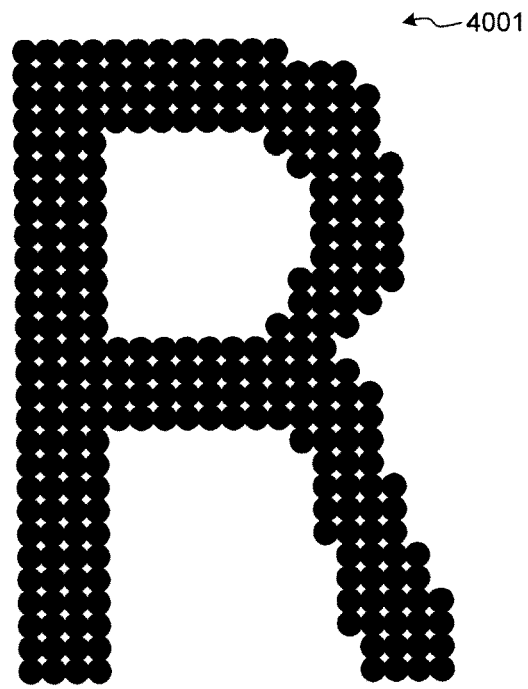
FIG. 8 is a diagram illustrating an example of an original image before image processing.
Figure 9:
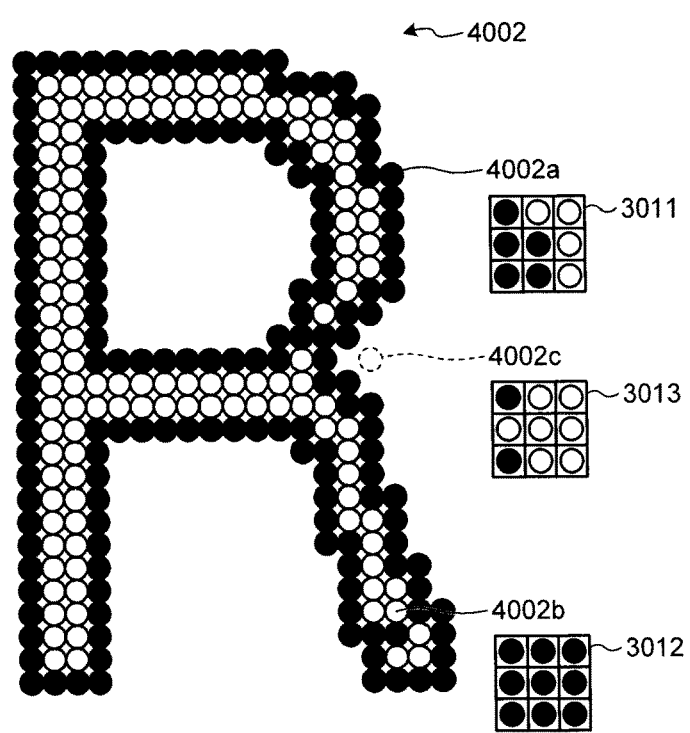
FIG. 9 is a diagram illustrating an example of an image obtained after image processing based on a contour image forming function.
Figure 10:
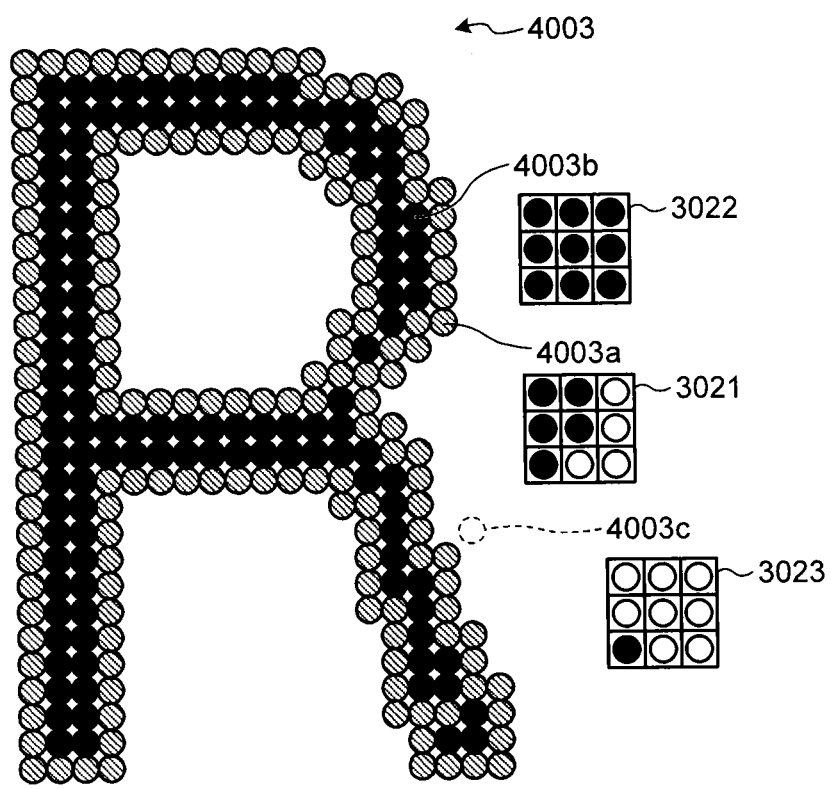
FIG. 10 is a diagram illustrating an example of an image obtained after image processing based on an edge density adjustment function.

FIG. 8 is a diagram illustrating an example of an original image before image processing. FIG. 9 is a diagram illustrating an example of an image obtained after image processing based on a contour image forming function. FIG. 10 is a diagram illustrating an example of an image obtained after image processing based on an edge density adjustment function. With reference to FIG. 8 to FIG. 10, an explanation is given of a process performed by the density converting unit 1313 to convert the density of a pixel of interest based on the identification code of the pixel of interest of a target partial image in the image processing performed by the image processing unit 1310.

A user, when printing image data in the printer unit 200, performs operation of selecting whether to cause the image processing unit 1310 to perform the image processing based on the contour extraction function or the image processing based on the edge density reducing function by operating the operation panel 1607 in advance. When the user performs operation of selecting the contour extraction function on the operation panel 1607, the control unit 1500 updates the data in the conversion table 2004 of the density converting unit 1313 with data for the contour extraction function. When the user performs operation of selecting the edge density reducing function on the operation panel 1607, the control unit 1500 updates the data in the conversion table 2004 with data for the edge density reducing function.

The density converting unit 1313 receives multivalued image data from the image processing unit 1200. Meanwhile, it is assumed that the multivalued image data received by the density converting unit 1313 contains, for example, an image (an original image 4001) indicating the alphabet of "R" as illustrated in FIG. 8. Further, as described above, the density converting unit 1313 takes each of pixels of the multivalued image data output by the image processing unit 1200 as a pixel of interest, and receives, from the pixel identifying unit 1312b, an identification code indicating what the pixel of interest is like for each of the pixels of the multivalued image data.

First, image processing performed when a user performs operation of selecting the contour extraction function on the operation panel 1607 will be described.

When the identification code of a pixel of the multivalued image data is the "edge portion", the density converting unit 1313 maintains the density of the pixel (pixel of interest) corresponding to the identification code on the basis of the conversion table 2004 with the identification code. For example, if the pixel of interest is a pixel 4002a illustrated in FIG. 9, the pixel identifying unit 1312b receives a target partial image 3011 from the buffer unit 1312a. The target partial image 3011 is a partial image with pixels of "black/white/white/black/black/white/black/black/white" in the order of arrangement of the pixel code. Therefore, the pixel identifying unit 1312b determines the character such that the pixel 4002a as the pixel of interest of the target partial image 3011 is the "edge portion", generates an identification code indicating the "edge portion", and sends the identification code to the density converting unit 1313. The density converting unit 1313 maintains the density of the pixel 4002a corresponding to the identification code on the basis of the conversion table 2004 with the received identification code indicating the "edge portion".

When the identification code of a pixel of the multivalued image data is the "non-edge portion", the density converting unit 1313 performs conversion such that the density of the pixel (pixel of interest) corresponding to the identification code matches a "white pixel" on the basis of the conversion table 2004 with the identification code. For example, if the pixel of interest is a pixel 4002b illustrated in FIG. 9, the pixel identifying unit 1312b receives a target partial image 3012 from the buffer unit 1312a. The target partial image 3012 is a partial image with pixels of "black/black/black/black/black/black/black/black/black" in the order of arrangement of the pixel code. Therefore, the pixel identifying unit 1312b determines the character such that the pixel 4002b as the pixel of interest of the target partial image 3012 is the "non-edge portion", generates an identification code indicating the "non-edge portion", and sends the identification code to the density converting unit 1313. The density converting unit 1313 performs conversion such that the density of the pixel 4002b corresponding to the identification code matches a "white pixel" on the basis of the conversion table 2004 with the received identification code indicating the "non-edge portion". Incidentally, to obtain the density of the "white pixel", for example, it may be preferable to set the pixel value to zero or a value smaller than the above described predetermined threshold. Namely, to obtain the density of the "white pixel", it is preferable to set the pixel value to a smaller value than at least the pixel value of the pixel corresponding to the "edge portion".

When the identification code of a pixel of the multivalued image data is the "non-image portion", the density converting unit 1313 maintains the density of the pixel (pixel of interest) corresponding to the identification code on the basis of the conversion table 2004 with the identification code. For example, if the pixel of interest is a pixel 4002c illustrated in FIG. 9, the pixel identifying unit 1312b receives a target partial image 3013 from the buffer unit 1312a. The target partial image 3013 is a partial image with pixels of "black/white/white/white/white/white/black/white/white" in the order of arrangement of the pixel code. Therefore, the pixel identifying unit 1312b determines the character such that the pixel 4002c as the pixel of interest of the target partial image 3013 is the "non-image portion", generates an identification code indicating the "non-image portion", and sends the identification code to the density converting unit 1313. The density converting unit 1313 maintains the density of the pixel 4002c corresponding to the identification code on the basis of the conversion table 2004 with the received identification code indicating the "non-image portion".

As described above, in the image processing performed when the operation of selecting the contour extraction function is performed, the density converting unit 1313 performs conversion such that the density of a pixel corresponding to the "non-edge portion" matches the "white pixel" and maintains the densities of pixels corresponding to the "edge portion" and the "non-image portion" in the image data received from the image processing unit 1200, thereby completing conversion to a converted image 4002. An image such as the converted image 4002, in which the contour of the original image 4001 is extracted, may be applicable to, for example, formation of images of coloring books, formation of images of letters with a predetermined point or greater within the range in which the readability is ensured, or the like.

Next, image processing performed when a user performs operation of selecting the edge density reducing function on the operation panel 1607 will be described.

When the identification code of a pixel of the multivalued image data is the "edge portion", the density converting unit 1313 performs conversion such that the density of the pixel (pixel of interest) corresponding to the identification code becomes lower than the original density on the basis of the conversion table 2004 with the identification code. For example, if the pixel of interest is a pixel 4003a illustrated in FIG. 10, the pixel identifying unit 1312b receives a target partial image 3021 from the buffer unit 1312a. The target partial image 3021 is a partial image with pixels of "black/black/white/black/black/white/black/white/white" in the order of arrangement of the pixel code. Therefore, the pixel identifying unit 1312b determines the character such that the pixel 4003*a* as the pixel of interest of the target partial image 3021 is the "edge portion", generates an identification code indicating the "edge portion", and sends the identification code to the density converting unit 1313. The density converting unit 1313 performs conversion such that the density of the pixel 4003*a* corresponding to the identification code becomes lower than the original density on the basis of the conversion table 2004 with the received identification code indicating the "edge portion".

When the identification code of a pixel of the multivalued image data is the "non-edge portion", the density converting unit 1313 maintains the density of the pixel (pixel of interest) corresponding to the identification code on the basis of the conversion table 2004 with the identification code. For example, if the pixel of interest is a pixel 4003*b* illustrated in FIG. 10, the pixel identifying unit 1312*b* receives a target partial image 3022 from the buffer unit 1312*a*. The target partial image 3022 is a partial image with pixels of "black/black/black/black/black/black/black/black/black" in the order of arrangement of the pixel code. Therefore, the pixel identifying unit 1312*b* determines the character such that the pixel 4003*b* as the pixel of interest of the target partial image 3022 is the "non-edge portion", generates an identification code indicating the "non-edge portion", and sends the identification code to the density converting unit 1313. The density converting unit 1313 maintains the density of the pixel 4003*b* corresponding to the identification code on the basis of the conversion table 2004 with the received identification code indicating the "non-edge portion".

When the identification code of a pixel of the multivalued image data is the "non-image portion", the density converting unit 1313 maintains the density of the pixel (pixel of interest) corresponding to the identification code on the basis of the conversion table 2004 with the identification code. For example, if the pixel of interest is a pixel 4003*c* illustrated in FIG. 10, the pixel identifying unit 1312*b* receives a target partial image 3023 from the buffer unit 1312*a*. The target partial image 3023 is a partial image with pixels of "white/white/white/white/white/white/black/white/white" in the order of arrangement of the pixel code. Therefore, the pixel identifying unit 1312*b* determines the character such that the pixel 4003*c* as the pixel of interest of the target partial image 3023 is the "non-image portion", generates an identification code indicating the "non-image portion", and sends the identification code to the density converting unit 1313. The density converting unit 1313 maintains the density of the pixel 4003*c* corresponding to the identification code on the basis of the conversion table 2004 with the received identification code indicating the "non-image portion".

As described above, in the image processing performed when the operation of selecting the edge density reducing function is performed, the density converting unit 1313 performs conversion such that the density of a pixel corresponding to the "edge portion" becomes lower than the original density and maintains the densities of pixels corresponding to "non-edge portion" and the "non-image portion" in the image data received from the image processing unit 1200, thereby completing conversion to a converted image 4003.

In the above description, whether the image processing unit 1310 performs the image processing based on the contour extraction function or the image processing based on the edge density reducing function is determined by user operation on the operation panel 1607; however, it is not limited thereto. Specifically, it may be possible to select the image processing based on one of the functions on the basis of the setting information obtained from an external apparatus, such as a client PC, connected to the image forming apparatus 1 via the interface device 1606.

Figure 11:
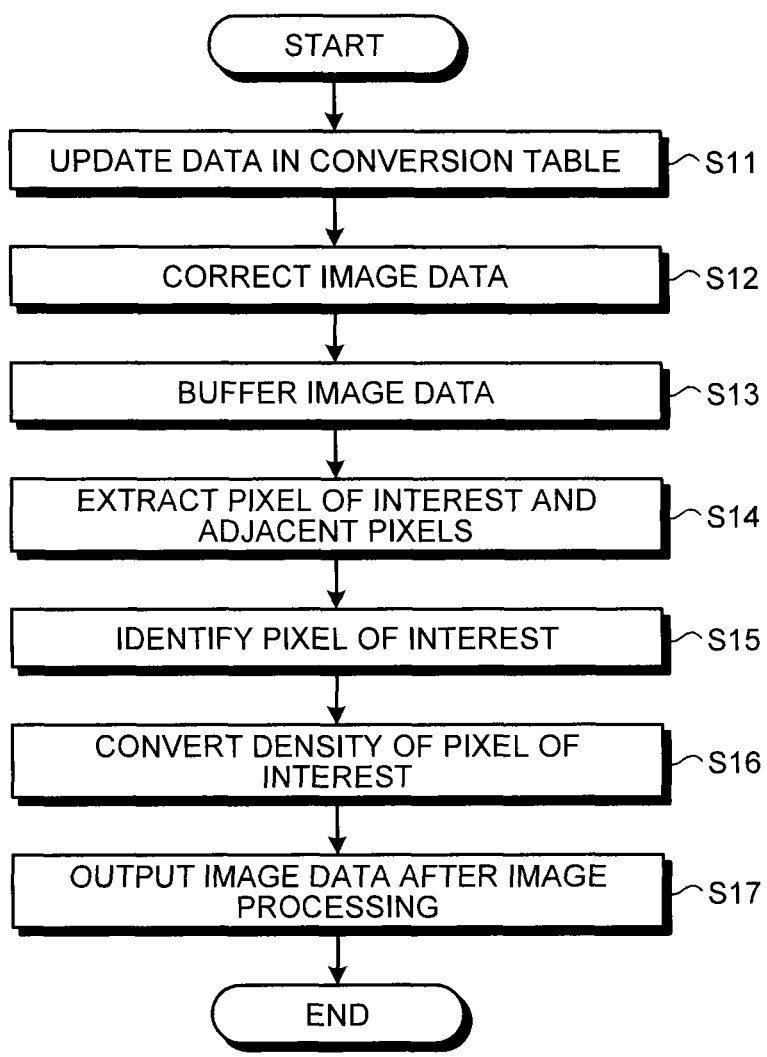
FIG. 11 is a flowchart illustrating an example of image processing operation performed by the image forming apparatus according to the embodiment.

FIG. 11 is a flowchart illustrating an example of image processing operation performed by the image forming apparatus according to the embodiment. With reference to FIG. 11, the flow of the image processing operation performed by the image forming apparatus 1 will be described in chronological order.

Step S11

A user, when printing image data in the printer unit 200, performs operation of selecting whether to cause the image processing unit 1310 to perform the image processing based on the contour extraction function or the image processing based on the edge density reducing function by operating the operation panel 1607 in advance. The control unit 1500 updates the data in the conversion table 2004 of the density converting unit 1313 in accordance with the selected contour extraction function or edge density reducing function.

Step S12

The image processing unit 1200 performs image quality correction processing, such as magnification change processing, rotation processing, or edge processing, on the image data received from the read processing unit 1100, converts the image data to multivalued image data, and transmits the multivalued image data to the image processing unit 1310 of the write control unit 1300.

Step S13

The buffer unit 1312*a* of the adjacent pixel interrelated processing unit 1312 of the image processing unit 1310 stores, in the line buffer 2001, only three horizontal pixel lines of the multivalued image data received from the image processing unit 1200.

Step S14

The pixel identifying unit 1312*b* of the adjacent pixel interrelated processing unit 1312 generates a pixel code for discriminating between a pixel of interest and adjacent pixels in a group of pixels of the target partial image by performing pattern matching between the target partial image received from the buffer unit 1312*a* and the image matrix 2002 stored therein.

Step S15

The pixel identifying unit 1312*b* performs character determination to determine what the pixel of interest of the target partial image is like, that is, whether the pixel of interest is the "edge portion", the "non-edge portion", or the "non-image portion" based on the generated pixel code, and generates an identification code as a result of the character determination. Specifically, the pixel identifying unit 1312*b* generates the identification code by acquiring the identification code corresponding to the pixel code from the lookup table 2003.

Step S16

The density converting unit 1313 receives the multivalued image data from the image processing unit 1200. The density converting unit 1313 takes each of pixels of the multivalued image data output by the image processing unit 1200 as a pixel of interest, and receives, from the pixel identifying unit 1312*b*, an identification code indicating what the pixel of interest is like for each of the pixels of the multivalued image data.

When the image processing based on the contour extraction function is selected, the density converting unit 1313 performs conversion such that the density of a pixel corresponding to the "non-edge portion" matches a "white pixel" and maintains the densities of pixels corresponding to the "edge portion" and the "non-image portion" in the image data received from the image processing unit 1200. When the image processing based on the edge density reducing function is selected, the density converting unit 1313 performs conversion such that the density of a pixel corresponding to the "edge portion" becomes lower than the original density and maintains the densities of pixels corresponding to the "non-edge portion" and the "non-image portion" of the image data received from the image processing unit 1200.

Step S17

The density converting unit 1313 outputs image data, which is the converted image data obtained after density conversion at Step S16 on the image data received from the image processing unit 1200, to the light-emission data generating unit 1320, and the image processing operation by the image forming apparatus 1 is finished.

As described above, a user performs operation of selecting whether to cause the image processing unit 1310 to perform the image processing based on the contour extraction function or the image processing based on the edge density reducing function by operating the operation panel 1607 in advance. As described above with reference to FIG. 9, in the image processing based on the contour extraction function, image processing for density conversion is performed such that the density of a pixel corresponding to the "non-edge portion" matches a "white pixel" having a lower density than the density of the original pixel of an image contained in the image data, and print operation is performed based on the image data obtained after the image processing. Therefore, when the contour extraction function is selected, it is possible to suppress the consumption of toner consumed in the print operation, enabling to reduce costs. In contrast, as described above with reference to FIG. 10, in the image processing based on the edge density reducing function, image processing for conversion is performed such that the density of a pixel corresponding to the "edge portion" becomes lower than the density of the original density of an image contained in the image data, and the print operation is performed based on the image data obtained after the image processing. Therefore, even when the edge density reducing function is selected, it is possible to suppress the consumption of toner consumed in the print operation, enabling to reduce costs.

Further, both in the case where an identification code of a pixel is generated through the image processing based on the contour extraction function and the case where an identification code of a pixel is generated through the image processing based on the edge density reducing function with respect to the image data transmitted from the image processing unit 1200, the image processing is implemented by the adjacent pixel interrelated processing unit 1312 and the density converting unit 1313 as common hardware circuits, such as ASICs. Further, when one of the contour extraction function and the edge density reducing function is selected, the control unit 1500 updates the data in the conversion table 2004 of the density converting unit 1313 with data for the selected function. Therefore, it is not necessary to separately provide a hardware circuit for implementing the image processing based on the the contour extraction function and a hardware circuit for implementing the image processing based on the edge density reducing function. Rather, it is possible to perform both image processing by a common hardware circuit, so that it is possible to prevent an increase in the scale of the hardware for the image processing. Furthermore, it is possible to reduce costs because of suppressing an increase in the scale of the hardware for the image processing. Meanwhile, not all of the components of the adjacent pixel interrelated processing unit 1312 and the density converting unit 1313 need to be configured by hardware, and a part of the functions may be implemented by executing a program as software.

Incidentally, as illustrated in FIG. 4, the buffer unit 1312a is configured to store therein only three horizontal pixel lines of the multivalued image data in the line buffer 2001; however, it is not limited thereto. Specifically, for example, the line buffer 2001 may be a line buffer for five lines or a line buffer for seven lines. Further, for example, if a 3×3 target partial image is used in the image processing based on the contour extraction function and a 5×5 target partial image is used in the image processing based on the edge density reducing function, it is preferable to provide, as the line buffer included in the buffer unit 1312a, a line buffer for five lines in accordance with the target partial image with a greater size. In this case, in the image processing based on the contour extraction function, it is preferable that the pixel identifying unit 1312b receives a 3×3 target partial image from a line buffer for three lines within the line buffer for five lines in the buffer unit 1312a. In this case, however, the lookup table 2003 needs to cope with both of a pixel code corresponding to a 3×3 target partial image and a pixel code corresponding to a 5×5 target partial image. Even in this case, it is possible to use the adjacent pixel interrelated processing unit 1312 as a common hardware circuit in both of the image processing based on the contour extraction function and the image processing based on the edge density reducing function, so that it is possible to suppress an increase in the scale of the hardware for the image processing.

Furthermore, the size of the target partial image is set to 3×3, that is, three pixels in the main-scanning direction and three pixels in the sub-scanning direction; however, it is not limited thereto. Namely, the size of the target partial image may be set to include three or more pixels in the main-scanning direction and three or more pixels in the sub-scanning direction. Moreover, as the size of the target partial image, the number of pixels in the main-scanning direction and the number of pixels in the sub-scanning direction need not be the same. For example, the size of the target partial image may be set to 3×5 or the like.

Furthermore, the buffer unit 1312a is not limited to one that stores only the odd number of horizontal pixel lines, such as three lines or five lines, of the multivalued image data in the line buffer 2001. Namely, the line buffer 2001 may be a line buffer that stores the even number of lines, such as four lines. In this case, the size of the target partial image received by the pixel identifying unit 1312b is 4×4. In this case, it is preferable that a pixel of interest of the image matrix is any of pixels in an inner 2×2 group.

Moreover, the pixel identifying unit 1312b identifies each of pixels (a pixel of interest and adjacent pixels) of a target partial image as one of two types of pixels such as a "black pixel" and a "white pixel" by comparison with a predetermined threshold; however, it is not limited thereto. For example, it may be possible to use two thresholds and determine whether each of the pixels corresponds to a "halftone pixel" corresponding to a pixel value between the "black pixel" and the "white pixel", in addition to the "black pixel" and the "white pixel". In this case, it is preferable to perform character determination to determine what the pixel of interest of the target partial image is like by matching a pixel code of the target partial image, in which each of the pixels is set to any of the "black pixel", the "white pixel", and the "halftone pixel", with the data in the lookup table 2003. Furthermore, it may be possible to determine four or more types of pixels, instead of determination on three types of pixels such as the "black pixel", the "white pixel", and the "halftone pixel".

Moreover, the pixel identifying unit 1312b performs character determination to determine which one of three types of the "edge portion", the "non-edge portion" and the "non-image portion" is the pixel of interest of the target partial image, and generates an identification code as a result of the character determination; however, it is not limited thereto. Namely, it may be possible to perform character determination to determine which one of four or more types is the pixel of interest of the target partial image. In this case, the identification code as a result of the character determination may be indicated by a 3-or-more-bit value instead of a 2-bit value. For example, as for the "edge portion", it may be possible to perform character determination as to two types such as a "first edge portion" and a "second edge portion". In this case, the "first edge portion" may indicate a pixel of an edge portion of an image, and the "second edge portion" may indicate a pixel located inside by one pixel of the "first edge portion". In this case, for example, in the contour extraction function, it may be possible to employ a conversion method, in which the density of a pixel corresponding to the "first edge portion" is maintained and the density of a pixel corresponding to the "second edge portion" is converted to a density that is reduced by a predetermined amount from the density of the pixel corresponding to the "first edge portion". Furthermore, for example, in the edge density reducing function, it may be possible to employ a conversion method, in which the density of a pixel corresponding to the "first edge portion" is converted to a smaller value than the original density and the density of a pixel corresponding to the "second edge portion" is reduced by a smaller amount than the amount of reduction in the density of the pixel corresponding to the "first edge portion".

Modification

Figure 12:
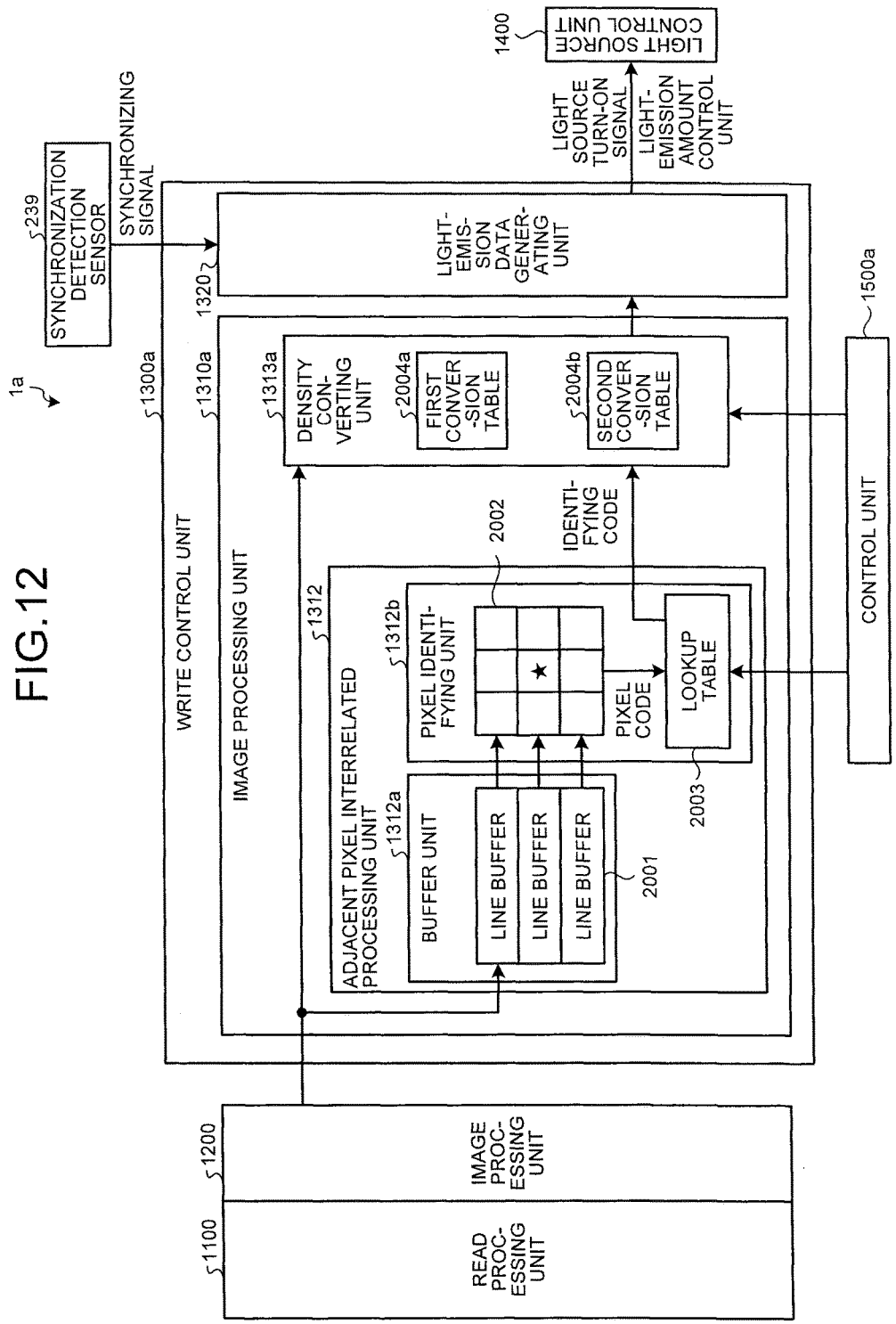
FIG. 12 is a diagram illustrating an example of a block configuration of an image forming apparatus according to a modification of the embodiment.

FIG. 12 is a diagram illustrating an example of a block configuration of an image forming apparatus according to a modification of the embodiment. With reference to FIG. 12, a block configuration of main components of an image forming apparatus 1a according to the modification will be described. The entire configuration and the hardware configuration of the image forming apparatus 1a and the configuration of the optical writing unit 230 are the same as those of the image forming apparatus 1 according to the embodiment. Configurations and operations of the image forming apparatus 1a according to the modification different from those of the image forming apparatus 1 will be described.

As illustrated in FIG. 12, the image forming apparatus 1a includes the read processing unit 1100, the image processing unit 1200, a write control unit 1300a (image processing apparatus), the light source control unit 1400, and a control unit 1500a (control means).

The write control unit 1300a is a processing unit that performs image processing based on at least the contour extraction function or the edge density reducing function on the image data received from the image processing unit 1200. The write control unit 1300a includes an image processing unit 1310a and a light-emission data generating unit 1320.

The image processing unit 1310a is a processing unit that adjusts densities of pixels of the image data by performing the image processing based on the contour extraction function or the edge density reducing function as described above. The image processing unit 1310a includes the adjacent pixel interrelated processing unit 1312 and a density converting unit 1313a (density conversion means).

The density converting unit 1313a is a processing unit that converts the density of a pixel of the image data received from the image processing unit 1200 on the basis of the identification code received from the adjacent pixel interrelated processing unit 1312. The density converting unit 1313a includes a first conversion table 2004a (first density conversion information) and a second conversion table 2004b (second density conversion information). The first conversion table 2004a is a table, which is used when the contour extraction function is selected and in which, for example, the identification code is associated with the density of a pixel. The second conversion table 2004b is a table, which is used when the edge density reducing function is selected and in which, for example, the identification code is associated with the density of a pixel. The density converting unit 1313a acquires the density of the pixel (pixel of interest) corresponding to the identification code of the received image data from the first conversion table 2004a when the contour extraction function is selected and from the second conversion table 2004b when the edge density reducing function is selected, and converts the pixel value so as to match the acquired density. The density converting unit 1313a transmits the image data with the converted pixel value to the light-emission data generating unit 1320. The density converting unit 1313a is realized by a hardware circuit, such as an ASIC. Meanwhile, in the first conversion table 2004a and the second conversion table 2004b, the identification code and the density of a pixel are associated in a table format; however, it is not limited thereto, and any type of information is applicable as long as the information associates the identification code with the density of a pixel.

The control unit 1500a controls each of the units of the image forming apparatus 1a to control the entire operation of the image forming apparatus 1a. The control unit 1500a updates data in the above described lookup table 2003 of the adjacent pixel interrelated processing unit 1312 as necessary. Further, when the image processing unit 1310a performs the image processing based on the contour extraction function on the image data, the control unit 1500a transmits a control signal to cause the density converting unit 1313a to use the first conversion table 2004a. In contrast, when the image processing unit 1310a performs the image processing based on the edge density reducing function on the image data, the control unit 1500a transmits a control signal to cause the density converting unit 1313a to use the second conversion table 2004b.

The other block configurations of the image forming apparatus 1a are the same as the block configurations of the image forming apparatus 1 according to the embodiment. Further, in the image processing performed by the image processing unit 1310a, a character determination process performed by the adjacent pixel interrelated processing unit 1312 and a pixel-of-interest density conversion process performed by the density converting unit 1313a are basically the same as those in the image processing performed by the image processing unit 1310 of the embodiment. However, the density converting unit 1313a converts densities of pixels of image data by using the first conversion table 2004a when the contour extraction function is selected and converts densities of pixels of image data by using the second conversion table 2004b when the edge density reducing function is selected, on the basis of the control signal received from the control unit 1500a.

As described above, the density converting unit 1313a includes the first conversion table 2004a and the second conversion table 2004*b*, converts densities of pixels of image data by using the first conversion table 2004*a* when the contour extraction function is selected, and converts densities of pixels of image data by using the second conversion table 2004*b* when the edge density reducing function is selected, on the basis of the control signal received from the control unit 1500*a*. Therefore, it is not necessary to update the data in a single conversion table depending on whether the contour extraction function or the edge density reducing function is selected as in the case of the image forming apparatus 1 according to the embodiment. Namely, it is preferable that the density converting unit 1313*a* switches between the first conversion table 2004*a* and the second conversion table 2004*b* based on the control signal from the control unit 1500*a*, and use the selected table for the density conversion. Further, the image forming apparatus 1*a* according to the modification achieves the same advantageous effects as those of the image forming apparatus 1.

According to an embodiment of the present invention, it is possible to suppress an increase in the scale of hardware for image processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
   an integrated circuit configured to
     receive image data,
     generate identification information of a pixel of interest of the received image data,
     access density conversion information from among a plurality of pieces of the density conversion information, the density conversion information being based on one of a plurality of image processing methods, in which the identification information is associated with the density conversion information, and
     convert a density of the pixel of interest to a density corresponding to the identification information by using only the identification information, or maintain the density of the pixel of interest unchanged when the density of the pixel of interest is not converted; and
   a processor communicatively coupled to a memory, the processor being configured to
     update the density conversion information in response to a newly selected image processing method, the updated density conversion information being associated with the newly selected image processing method.

2. The image processing system according to claim 1, wherein the integrated circuit is further configured to
   extract a target partial image formed of the pixel of interest and adjacent pixels from the received image data,
   determine a character of the pixel of interest based on the pixel of interest and the adjacent pixels, and
   generate the identification information indicating a result of determination on the character.

3. The image processing system according to claim 2, wherein the integrated circuit is further configured to extract the target partial image formed of three or more pixels in a main-scanning direction and three or more pixels in a sub-scanning direction from the image data.

4. The image processing system according to claim 1, wherein the integrated circuit is further configured to
   generate pixel information, on which densities of pixels of a target partial image are reflected,
   include identification conversion information, in which the pixel information is associated with the identification information, and
   generate the identification information by acquiring the identification information corresponding to the generated pixel information from the identification conversion information.

5. The image processing system according to claim 1, wherein the integrated circuit is further configured to perform character determination to determine whether the pixel of interest of a target partial image corresponds to an edge portion of an image element contained in an image of the image data, a non-edge portion that is not an edge of the image element, or a non-image portion that is not contained in the image element.

6. The image processing system according to claim 5, wherein the integrated circuit is further configured to perform conversion such that the density of the pixel of interest of the target partial image is determined as corresponding to the non-edge portion becomes lower than a predetermined threshold of density.

7. The image processing system according to claim 5, wherein the integrated circuit is further configured to perform conversion such that the density of the pixel of interest of the target partial image is determined as corresponding to the edge portion becomes lower than an original density.

8. The image processing system according to claim 1, wherein the integrated circuit is further configured to generate a light source control signal for controlling laser light emitted from a light source based on a converted image data, in which the density of a pixel of interest of a target partial image is converted by the circuitry.

9. The image processing system according to claim 1, wherein the integrated circuit is further configured to
   receive a light source control signal and control operation of the laser light based on the light source control signal, and
   form an electrostatic latent image by scanning a photoconductor with the laser light.

10. An image processing method comprising:
    receiving image data;
    generating, with circuitry, identification information of a pixel of interest of the received image data;
    accessing, with the circuitry, density conversion information from among a plurality of pieces of the density conversion information, the density conversion information being based on one of a plurality of image processing methods, in which the identification information is associated with the density conversion information;
    converting, with the circuitry, density of the pixel of interest to a density corresponding to the identification information by using only the identification information, or maintaining the density of the pixel of interest unchanged when the density of the pixel of interest is not converted; and
    updating, with the circuitry, the density conversion information in response to a newly selected image processing method, the updated density conversion information being associated with the newly selected image processing method.

11. The image processing system according to claim 1, wherein the integrated circuit is further configured to generate a light source control signal to control laser light emitted from a light source based on the updated density conversion information, the light source control signal including a light source turn-on signal and a light-emission amount control signal.

12. An image processing system comprising:
an integrated circuit configured to
receive image data,
generate identification information of a density of a pixel of interest of the received image data,
access density conversion information, in which the identification information is associated with the density conversion information,
convert the density of the pixel of interest to a density corresponding to the identification information by using only the identification information, or maintain the density of the pixel of interest unchanged when the density of the pixel of interest is not converted, the density conversion information being based on one of a plurality of image processing methods, in which the identification information is associated with the density conversion information; and
a processor communicatively coupled to a non-transitory computer-readable storage medium, wherein the computer-readable storage medium stores instructions that, when executed by the processor, cause the processor to update the density conversion information in response to a newly selected image processing method, the updated density conversion information being associated with the newly selected image processing method.

13. The image processing system according to claim 12, wherein the integrated circuit is further configured to
extract a target partial image formed of the pixel of interest and adjacent pixels from the received image data,
determine a character of the pixel of interest based on the pixel of interest and the adjacent pixels, and
generate the identification information indicating a result of determination on the character.

14. The image processing system according to claim 13, wherein the integrated circuit is further configured to extract the target partial image formed of three or more pixels in a main-scanning direction and three or more pixels in a sub-scanning direction from the image data.

15. The image processing system according to claim 12, wherein the integrated circuit is further configured to
generate pixel information, on which densities of pixels of a target partial image are reflected,
include identification conversion information, in which the pixel information is associated with the identification information, and
generate the identification information by acquiring the identification information corresponding to the generated pixel information from the identification conversion information.

16. The image processing system according to claim 12, wherein the integrated circuit is further configured to perform character determination to determine whether the pixel of interest of a target partial image corresponds to an edge portion of an image element contained in an image of the image data, a non-edge portion that is not an edge of the image element, or a non-image portion that is not contained in the image element.

17. The image processing system according to claim 16, wherein the integrated circuit is further configured to perform conversion such that the density of the pixel of interest of the target partial image is determined as corresponding to the non-edge portion becomes lower than a predetermined threshold of density.

18. The image processing system according to claim 16, wherein the integrated circuit is further configured to perform conversion such that the density of the pixel of interest of the target partial image is determined as corresponding to the edge portion becomes lower than an original density.

19. The image processing system according to claim 12, wherein the integrated circuit is further configured to:
generate a light source control signal for controlling laser light emitted from a light source based on a converted image data, in which the density of a pixel of interest of a target partial image is converted by the circuitry.

20. The image processing system according to claim 10, wherein the image processing method includes at least one of a contour extraction function and an edge density reduction function.

* * * * *